United States Patent [19]
Kurata

[11] Patent Number: 6,155,292
[45] Date of Patent: Dec. 5, 2000

[54] METHOD AND A SYNTHETIC DANGER PREDICTING AND DISASTER PREVENTING MONITOR SYSTEM IN WHICH PIPELINES LAID UNDER THE GROUND OR THROUGH A STRUCTURE ARE EMPLOYED IN THEIR ENTIRETY FOR A SYNTHETIC DANGER PREDICTING ALARM SENSOR

[76] Inventor: Sakuji Kurata, 5-33-501, Aioidori 1-chome, Abeno-ku, Osaka, Japan

[21] Appl. No.: 09/265,909

[22] Filed: Mar. 10, 1999

[30] Foreign Application Priority Data

Mar. 12, 1998 [JP] Japan .................................. 10-082663

[51] Int. Cl.[7] ...................................................... E03B 7/07
[52] U.S. Cl. ........................ 137/552; 137/551; 137/372; 73/40.5 R
[58] Field of Search .................................. 137/551, 552, 137/372; 73/40.5 R

[56] References Cited

U.S. PATENT DOCUMENTS

| | | | |
|---|---|---|---|
| 2,072,384 | 3/1937 | Schmidt | 137/552 |
| 3,466,641 | 9/1969 | Futman | 137/551 |
| 5,347,264 | 9/1994 | Bjorkman | 340/611 |
| 5,568,825 | 10/1996 | Faulk | 137/624.11 |
| 5,680,329 | 10/1997 | Lloyd et al. | 364/528.1 |
| 5,986,573 | 11/1999 | Franklin et al. | 340/870.02 |

*Primary Examiner*—A. Michael Chambers
*Attorney, Agent, or Firm*—Koda & Androlia

[57] ABSTRACT

A method and a synthetic danger predicting and disaster preventing monitor system in which waterworks pipelines laid around under the ground or through a structure are employed in their entirety for a synthetic danger predicting alarm sensor to thereby predict a variety of occurable trouble, discover a sign of disastrous incidence early before a great accident results, and locate the place at which trouble occurs so that trouble remedying works are completed before a resultant great accident happens. Both end portions of piping 1 positioned across each of a great number of specific intervals (Nos. 1 to N) set at required portions of water distributing pipelines laid under the ground or through a structure are fitted with synthetic sensors S provided with detector portions for sound, radiation, heat, mechanical strain, electricity, magnetism and vibration. Signals simultaneously measured by means of the detector portions of said sensors S are measured including those of information of abnormality caused by variation of the respective detecting signals from their normal condition. The measured data signals are subjected to A-D conversion, and are transmitted in the form of a radio wave to a communications satellite from a manhole antenna. The data signals received through the communications satellite are collected and analyzed by means of a data processor to check them for abnormality. If the data signals are judged to be of information of abnormality, a display unit for information of abnormality indicates the position and particulars of trouble which causes the information of abnormality.

5 Claims, 8 Drawing Sheets

Collective Monitoring Center

METHOD AND A SYNTHETIC DANGER PREDICTING AND DISASTER PREVENTING MONITOR SYSTEM IN WHICH PIPELINES LAID UNDER THE GROUND OR THROUGH A STRUCTURE ARE EMPLOYED IN THEIR ENTIRETY FOR A SYNTHETIC DANGER PREDICTING ALARM SENSOR

BACKGROUND OF THE INVENTION

1. Field of the Invention

This invention relates to a method in which waterworks pipelines buried in the earth or those internally arranged in structures such as buildings and the like are used in their entirety as a synthetic danger predicting alarm sensor, and also to a synthetic danger predicting and disaster preventing monitor system in which said method is employed to perform centralized remote watching upon the whole of the pipelines, whereby it is achieved to predict occurrence of disaster or other similar great trouble in a specific district.

2. Prior Art

Nowadays, a great number of natural calamities, or disaster caused by human neglect or inadvertency take place on the Earth. However, in a conventional art, there is only provided inspecting technique for water leakage, in which water leakage is detected in a water distributing pipeline for waterworks which is buried and laid in the earth to thereby locate the water leakage.

That is to say, there is no technique to detect occurrence of some trouble in the earth in a specific district, or in the interior of a building or any other similar structure in a specific district, thereby allowing occurrence of disaster to be foreseen in said district or said structure.

There is a great frequency of trouble occurrence which is caused by a cave-in or subsidence of the ground, and which results from leakage of radioactive rays in recent years. However, it is never executed at present to take measures against disaster by predicting trouble before it occurs, and under the existing circumstances, no steps are taken to remedy trouble before it happens.

Also, as disaster which frequently occurs in recent years, a manufacturing factory occasionally undergoes trouble in which the manufacturing line thereof and the like are subjected to an extreme increase in temperature for some reason, and this brings about fire or explosion, thereby causing the destruction of the factory building. In most cases, the factory building is provided with a thermal sensor, a smoke sensor, and the like on the inside surface of the ceiling thereof. However, these sensors only sense heat or smoke when fire has taken place, and do not function to predict fire or explosion.

In view of the foregoing disadvantage in which nowadays, disaster or trouble predicting technique is not established, the present invention is intended to predict a variety of trouble such as described in the foregoing, discover a sign of trouble early sufficiently before disaster happens, and locate a place in which disaster can occur, thereby allowing the remedy of trouble to be completed before a great scale of disaster results.

Today, in large cities, and small cities and towns, pipelines for different purposes are laid such that they spread over their whole regions in a network-shaped configuration under the ground. Also, structures which are required to be fed with water have waterworks pipelines laid through their interiors such as to stretch over their wholes.

SUMMARY OF THE INVENTION

It is an object of the present invention to provide a method in which the pipelines laid over the cities and towns under the ground or through structures are used in their entirety as a synthetic danger predicting alarm sensor, and also to provide a synthetic danger predicting and disaster preventing monitor system in which said method is applied.

In the present invention, in order to accomplish the foregoing object, the method in which the pipelines under the ground, or those through the structures are used in their entirety as a synthetic danger predicting alarm sensor is arranged as described hereinafter.

All-around pipelines laid under the ground and those through structures such as buildings and the like have a great number of specific intervals of place particularly set at their necessary positions, and each component piping which corresponds to each of these specific intervals of place is fitted with synthetic sensors at both end portions thereof.

The synthetic sensors are provided with detector portions which respectively take measurements of sound, radiation, heat, mechanical strain, electricity, magnetism, and vibration.

Each detecting signal given as a result of the simultaneous measurement of the measuring items specified in the foregoing is checked for any variation thereof from the normal condition thereof. This variation allows signal of abnormality information to be measured inside and outside the pipelines laid under the ground or through the structures, or to be gauged within geologic strata and structures.

The analysis of the signals of abnormality information measured can predict trouble and resulting disaster at one or ones of a great number of specific intervals of place particularly set in long-distance pipelines.

As a result, the values of measurements are allowed to be obtained in connection with sound, radiation, heat, mechanical strain, electricity, magnetism and vibration from the detector portions of the synthetic sensors attached to both end portions of each component piping disposed across each of specific intervals of place which are set at the required portions of the respective pipelines laid under the ground such as to stretch in a network-shaped configuration over large cities or small cities or towns, and also of the respective pipelines laid around through structures such as buildings and the like.

In this case, if one of the specific intervals of place of each pipeline undergoes some variation from the normal condition thereof, which may result in the occurrence of trouble or disaster, this variation can be measured as abnormality information signal. The analysis of this abnormality information signal allows prediction of the kind or type and a specific interval of place of occurable trouble or disaster.

In order to attach the synthetic sensors to both end portions of each component piping disposed across the respective specific intervals of place, each synthetic sensor may be mounted on a pair of jointing portions of the piping which are adjacent to each other, and are exposed in each spacious portion immediately under a manhole cover. Also, in a structure having pipelines laid therethrough, the synthetic sensors may similarly be fitted to pairs of piping jointing portions which are adjoining to each other, and are exposed in an internal spacious portion of the structure. This facilitates the attachment of the synthetic sensors to the piping and simultaneously any subsequent technical maintenance of the sensors.

The synthetic sensors are allowed to receive each detecting signal as described hereinafter. In order to receive a detecting signal of sound, an underwater microphone is used which is attached to one of the synthetic sensors such that it protrudes into the piping. In this case, the synthetic sensor is mounted in a configuration of a ringed belt on a side of the jointing portion of the piping along the outer circumferential portion thereof.

Radiation is detected by using measuring sensors for underground radiation doses outside the piping, which are disposed on the outer circumferential portion of the piping within the synthetic sensor. Detection of heat is carried out by means of temperature sensors positioned on the outer circumferential portion of the piping within the synthetic sensor and also a temperature sensor arranged such as to protrude into the piping.

Mechanical strain is detected by using strain gauges disposed on the outer circumferential portion of the piping within the synthetic sensor to measure external strain of the piping. Electric detection is executed by using measuring sensors which are positioned on the outer circumferential portion of the piping within the synthetic sensor to detect potential difference between the piping and the contact portion of the synthetic sensors with the underground earth.

Magnetism is detected by the use of magnetism sensors disposed on the outer circumferential portion of the piping within the synthetic sensors. Detection of vibration is performed by means of the underwater microphones described in the foregoing. If the underwater microphones provided such as to protrude into the piping out of the synthetic sensors attached to both ends of each specific interval of piping detects underwater sound, and moreover, both synthetic sensors detect any vibratory abnormality as a result of measurement of a vibratory variation from the normal vibratory condition, it is feasible to locate a specific interval of place in the pipeline which includes water leakage or other trouble, whereby prediction can be performed upon disaster caused by the trouble such as water leakage (disaster such as cave-in or subsidence of the land which results from partial outflow of the earth and sand), and at the same time, the wave forms of the underwater sounds from both sensors are composed into a single wave form by using the invention "Method for Detecting Water Leakage from Water Distributing Piping" proposed by the applicant of the present application in Japanese Patent Application No. 296257-1997 previously filed, and the wave form thus obtained by the composition is checked for conformity to that of the sound of water leakage. In this case, if the composed wave form is judged to be that of the sound of water leakage, the position of the peak thereof allows the position of water leakage to be located by computation.

Detection of radiation by using the measuring sensors for underground radiation doses outside the piping, which are disposed on the outer circumferential portion of the piping within the synthetic sensors attached to both end portions of the piping positioned across a specific interval of the pipeline to thereby locate a specific interval of pipeline which includes radiational trouble. This allows prediction of danger of radiational disaster. Also, a difference between both measuring sensors in their readings can presume the position in the pipeline at which the source of abnormal radiation exists.

The temperature sensors disposed on the outer circumferential portion of the piping within the synthetic sensors attached to both end portions of each specific interval of piping, and the different temperature sensor provided such as to jut into the piping execute thermal detection, and if a difference between the internally protruded temperature sensor of the piping and the outer circumferential side temperature sensors of the piping in their detected temperatures varies from the normal state, a change in the geologic stratum including active faulting can be identified provided that the pipeline is buried in the earth.

Also, for the pipeline arranged through a structure, these temperature sensors detect an extreme increase in a temperature of component piping thereof to thereby identify the position (a specific interval of place) of the pipeline. As a result, it is feasible to achieve prediction of danger of occurable disaster such as fire, explosion or other similar trouble.

The strain gauges disposed on the outer circumferential portions of the piping within the synthetic sensors to measure external strain of the piping detects mechanical strain of the piping. In practice, a measure is taken of variation in the resistance which may be caused by strain of a semiconductor of, for example, a ceramic sensor which forms the strain gauge, and this allows the location or identification of a specific interval of place of the pipeline at which a cave-in or subsidence of the ground occurs, thereby achieving prediction or presumption of a danger of disastrous incidence.

Electric deflection is feasible by using the measuring sensors for potential difference between the piping and the contact portion of each synthetic sensor with the underground earth, which sensors are positioned on the outer circumferential portion of the piping within each synthetic sensor. This allows the location or identification of a specific interval of place at which water distributing piping threatens electrolytic corrosion thereof, thereby allowing prediction of a danger of occurable trouble such as water leakage which can be caused by the electrolytic corrosion, or subsidence of the ground which can result from such water leakage, or any other similar trouble.

In order to detect magnetism, the magnetism sensors are used which are disposed on the outer circumferential portion of the piping within the synthetic sensors attached to both ends of piping across each specific interval of place of the pipelines. This detection of magnetism is to make provision for the breakage of the measuring or detecting circuits for internal sound of the piping, radiation, heat, mechanical strain, potential difference between the piping and the contact portion of each synthetic sensor with the underground earth, and vibration, because a certain or greater degree of magnetism which results from a magnetic field occurring in the specific interval of the pipeline disables detection or measures of the foregoing detecting or measuring items. That is to say, if the magnetism sensors detect a certain or greater degree of magnetism, the sensors function to shut off the foregoing measuring or detecting circuits on the safe side, thereby ensuring that the measuring or detecting circuits are always in condition for trouble-free smooth operation.

The underwater microphones provided such as to protrude into the piping out of the synthetic sensors attached to both ends of piping laid across each of specific intervals of place detects underwater vibration☐ and if both synthetic sensors take measurement of the underwater vibration, and detects any variation in the vibration from the normal condition thereof to thereby allow any vibratory abnormality to be identified, and also when a vibratory wave form obtained by composing vibratory wave forms produced from both synthetic sensors is judged to be of underwater sound, not of sound of water leakage, a specific interval of place of the pipeline which includes some underground abnormality, thereby achieving prediction and presumption of a risk in which disaster may occur as a result of a formation of a cavity in the ground.

Also, the wave forms of abnormal vibration detected by means of both synthetic sensors are composed into a single wave form, and the vibratory source is located from the position of the peak thereof to thereby allow the place of occurable disaster to be predicted and presumed.

On the other hand, the synthetic danger predicting and disaster preventing monitor system according to the present invention which performs remote concentrated monitoring upon the entire pipelines comprises the synthetic sensors which are attached to both ends of each component piping positioned across each of a great required number of specified intervals of place to detect abnormal signals in connection with sound within the piping, radiation, heat, mechanical strain, potential difference between the piping and the contact portion of each synthetic sensor with the underground earth, magnetism, vibration, and the like, a wireless transmitting means arranged to make A-D conversion for each data signal given from the synthetic sensors and to transmit radio waves to a communications satellite through a wireless data transmitter from a parabolic antenna attached to the outer circumferential portion of the manhole cover under which or the structure through which the pipelines are laid.

Moreover, the monitor system according to the present invention also comprises a receiving means for data signals in the form of radio waves, and a data-signal processor means which inputs received data signals therein, analyzes the data signals for each specific interval of each pipeline to thereby make a judgement as to whether they are signals of abnormality or not, and detect a specific interval of piping in the pipeline at which abnormality occurs when the abnormality signals are identified.

Also, the monitor system according to the present invention comprises a positional display indicating at least a specific interval of piping in the pipelines at which abnormality occurs, by using a screen thereof which shows the pipeline including that specific interval of place located and revealed from a total number of pipelines forming or map depicting a network of water distributing piping.

Moreover, the monitor system according to the present invention comprises a different kind of display means including a monitor, a printer and other similar means which displays the substance of the trouble inside the pipeline to thereby locate or presume the place and definite specification of trouble before disaster occurs so that danger can be predicted.

With such an arrangement, in the synthetic danger predicting and disaster preventing monitor system according to the present invention, each detector portion of the synthetic sensors attached to both end portions of piping positioned across a specific interval of pipeline obtains data signals of sound, mechanical strain, electricity, magnetism, magnetism and other required measuring items. These data signals have A-D conversion performed upon them, and their radio waves are transmitted to a communication satellite through a wireless data transmitter from a parabolic antenna attached to the outer circumferential portion of the manhole cover under which or the structure through which the pipelines are laid.

The communication satellite which receives the radio waves from the parabolic antenna transmits radio waves of data signals back to a grounded receiving means for data signals. The data signals received by the receiving means are inputted into the data-signal processor means, and are analyzed for each specific interval of place in a pipeline. If the data signals are consequently judged to be abnormality signals, the specific interval of place in a pipeline which includes trouble causing the abnormality signals is detected, and it is feasible to display at least this specific interval of place in the screen of the positional display thereof which shows the specific interval of place in a network of water distributing pipelines, while at the same time, particulars of the trouble can be displayed in the accessory monitor, or printed out by using the attached printer.

Also, the abnormality signals (wave forms) obtained from the synthetic sensors attached to both ends of the piping provided across a specific interval of place in the pipeline are composed into a single wave form to thereby allow the source of abnormality to be located from the position of the peak thereof.

Thus, collective constant remote monitoring is carried out upon occurability of trouble in a network of water distributing pipelines for waterworks which are laid over cities and the like to thereby achieve the location or identification of a position at which the trouble occurs, and also presumption of particulars of the trouble by selecting a relative specific interval of place in the pipeline. This can predict a danger of occurrence of disaster which can be caused by the trouble.

Also, in the synthetic danger predicting and disaster preventing monitor system according to the present invention, the display for the position at which trouble occurs may comprise an automotive navigator mounted on a vehicle as well as a receiving means for data signals from the communications satellite and a processor means for data signals received by the receiving means. This navigator is arranged to indicate in a picture of a map displayed thereby a specific interval of piping in the pipelines at which trouble occurs to thereby achieve movable type crisis control.

An automobile which is provided with the automotive navigator is, so to speak, a data collecting and analyzing vehicle arranged to indicate a picture of a map which shows a specific interval of piping in the pipelines at which trouble occurs, and in this vehicle, A-D conversion is performed upon each data signal given by means of the synthetic sensors attached to both end portions of piping positioned across each of a great number of specific intervals of place set at necessary portions of the pipeline, and each data signal thus converted from an analog signal to a digital signal is transmitted in the form of a radio wave to the communications satellite from the wireless data transmitter through the parabolic antenna mounted on the outer circumferential portion of the manhole cover under or the structure through which the pipelines are laid around.

Moreover, the data collecting and analyzing vehicle analyzes for each specific interval of place in each pipeline the data signals received by using the data signal processor mounted thereon, and judges if each data signal is an abnormality signal. If a data signal is consequently judged to be an abnormality signal, a specific interval of place in the pipeline at which trouble occurs is identified, thereby allowing the automotive navigator to indicate this specific interval of place in the map picture.

Alternatively, a fixed type collective monitoring center is allowed to receive the data signals transmitted from the communications satellite. However, the fixed type collective monitoring center may occasionally undergo trouble in the function thereof, and can not analyze data signals given from the pipelines. In this case, the movable type data collecting and analyzing vehicle can receive and analyze data signals transmitted from the communication satellite by the use of the data signal processor mounted thereon to thereby locate a specific interval of place a pipeline at which trouble occurs. That is to say, the movable type data collecting and analyzing vehicle acts as a backup system of the fixed type collective monitoring center falling under a malfunction, and achieves prediction and presumption of a place at which disaster may result.

Also, in this movable type data collecting and analyzing vehicle, the screen of a map in the display mounted thereon allows indication of a position at which the vehicle presently exists or runs, and simultaneously that of a specific interval of place in the pipelines at which trouble takes place, and this allows this vehicle to readily go to the place at which the trouble occurs, thereby achieving the taking of efficient speedy measure against trouble or disaster which has occurred.

In this case, if the fixed type collective monitoring center is free from any trouble and is operable, the movable type data collecting and analyzing vehicle can transmit a signal collected and analyzed thereby to thereby indicate in the screen of the display thereof a specific interval of place in the pipeline at which trouble occurs, and particulars of the trouble.

BRIEF DESCRIPTION OF THE DRAWINGS

FIG. 2 is a constructional illustration of the synthetic sensor attached to the jointing portion of the water distributing piping, which includes FIG. 2(A) and FIG. 2(B).

FIG. 5 includes FIGS. 5(A) and 5(B).

FIG. 6 shows the detecting system for information of abnormality which is mounted on the data collecting and analyzing vehicle.

FIG. 7 includes FIGS. 7(A), 7(B) and 7(C) which are cross sectional views of the same piping, showing in that order an example in which disaster gradually develops.

DETAILED DESCRIPTION OF THE PREFERRED EMBODIMENTS

The present invention provides for a method in which pipelines laid under the ground or through structures are used in their entity as a synthetic danger predicting alarm sensor, and also a synthetic danger predicting and disaster preventing monitor system. This method and this monitor system according to the present invention will now be described in the form of a preferred embodiment of the present invention with reference to the accompanying drawings.

Figure 1:
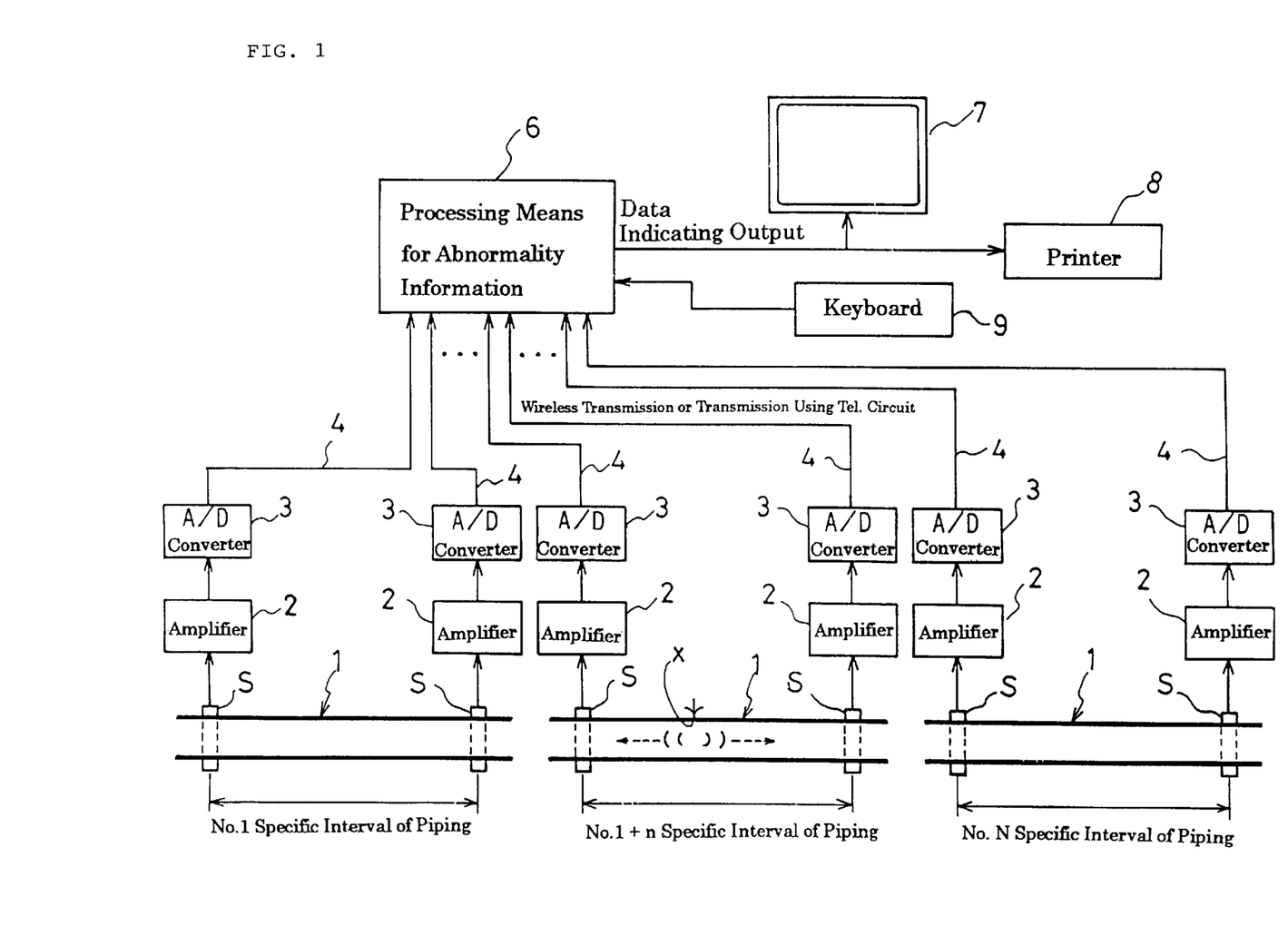
FIG. 1 is a block diagram of the system to apply the method according to the present invention in which the pipelines are used in their entirety for the synthetic danger predicting alarm sensor.
Figure 2A:
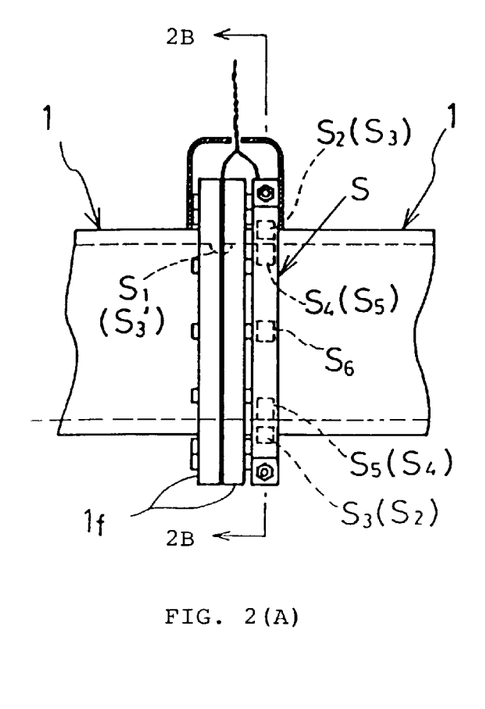
FIG. 2(A) is a side view.
Figure 2B:
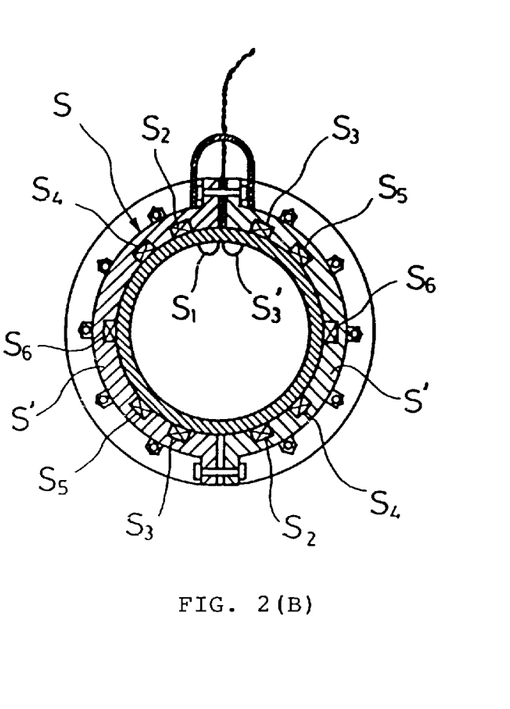
FIG. 2(B) is a longitudinally sectional view taken along the line 2B—2B.
Figure 3:
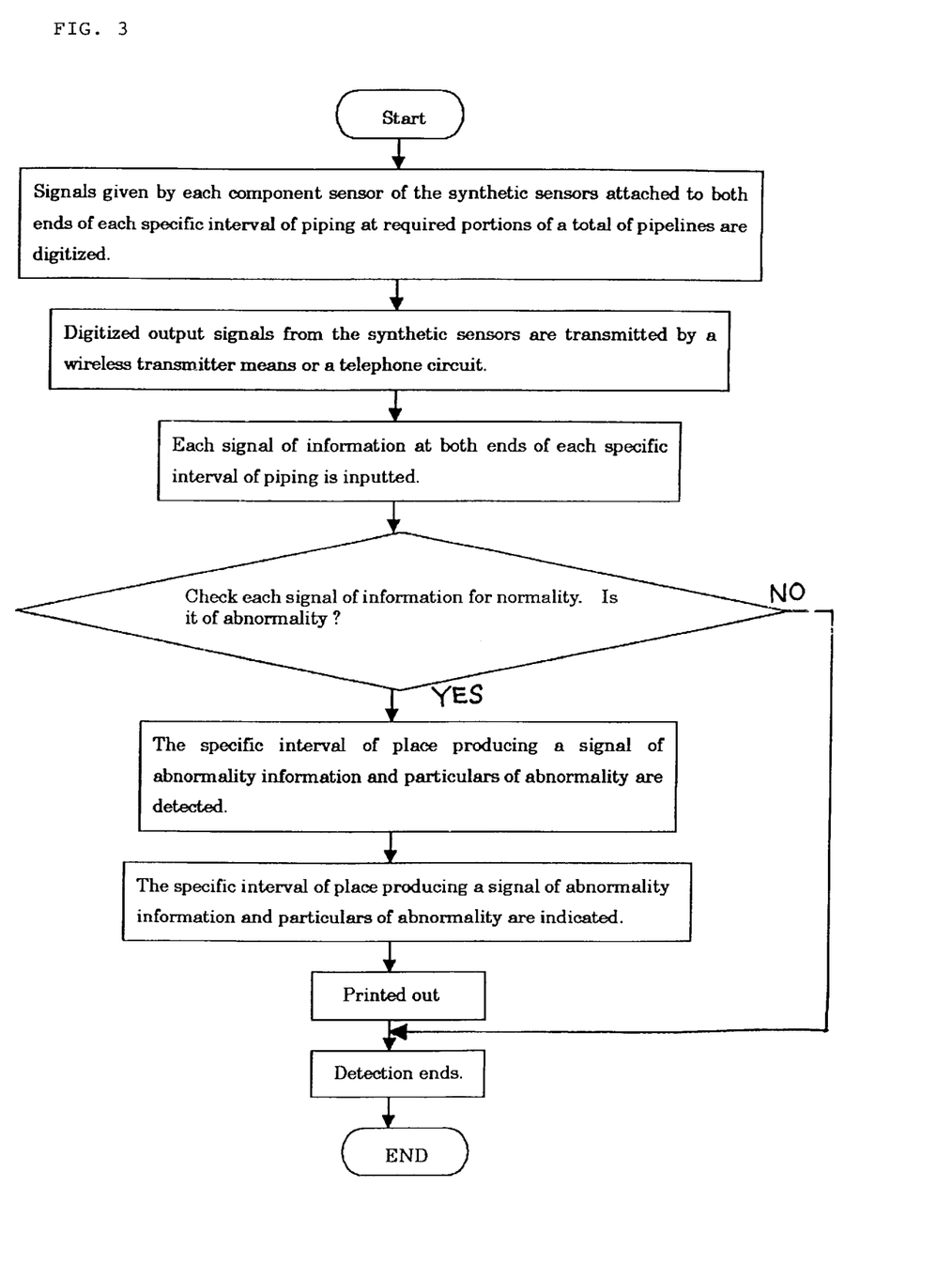
FIG. 3 is a flow chart showing the procedure for detecting and indicating the position at which disaster takes place.
Figure 4:
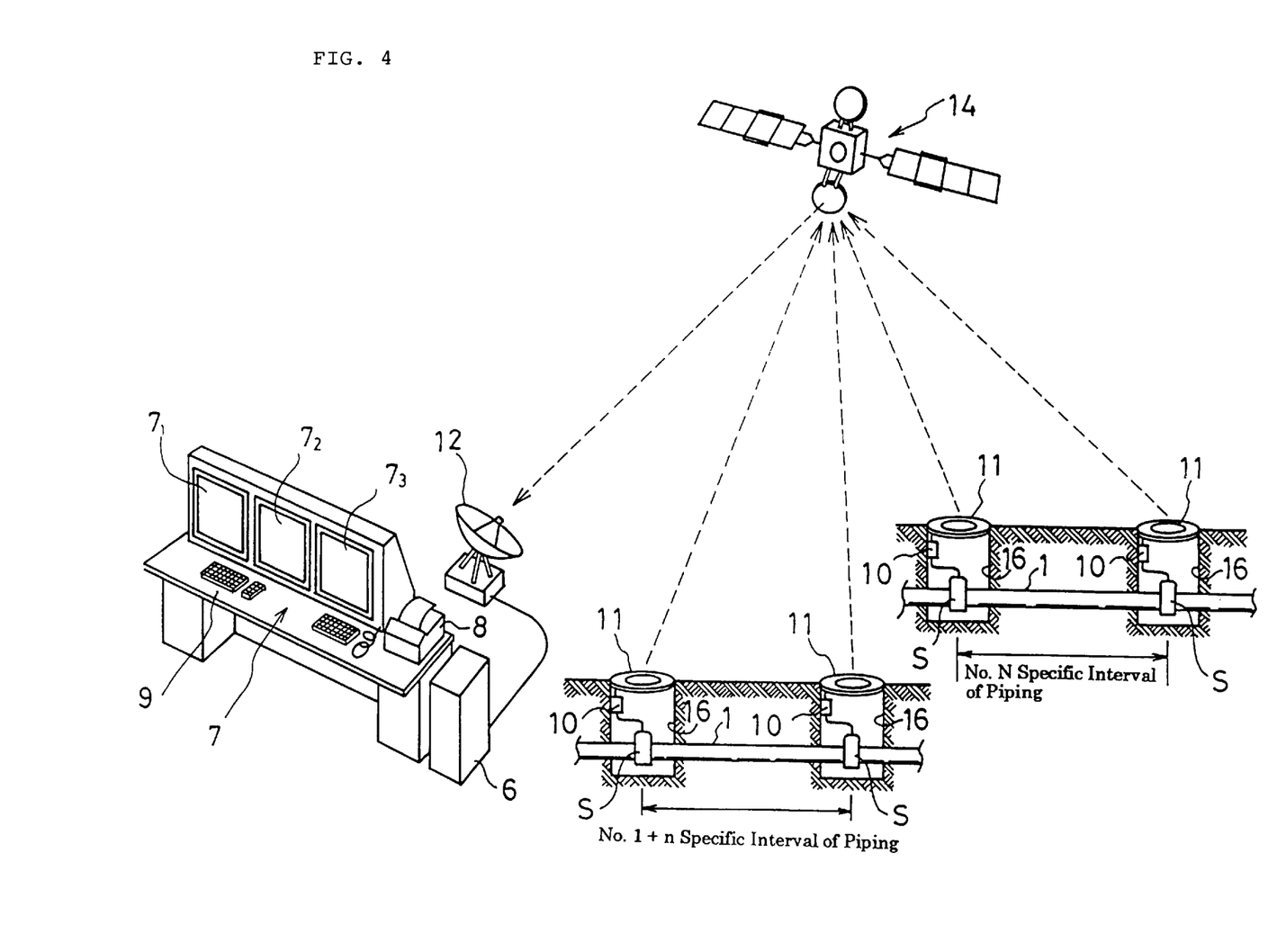
FIG. 4 is a diagram of typical operation of the synthetic danger predicting and disaster preventing monitor system applied to the water distributing pipeline according to the present invention.

FIG. 1 is a block diagram of the synthetic danger predicting alarm sensor for which each pipeline is used as a whole according to the present invention. FIG. 2 is an arrangement plan of the synthetic danger predicting alarm sensor attached to a jointing portion of each component piping of the water distributing pipeline. FIG. 3 is a flow chart which shows a procedure for detecting and indicating according to a preferred embodiment of the present invention a specific interval of place in the pipelines at which trouble occurs. FIG. 4 is a diagram of typical operation of the synthetic danger predicting and disaster preventing monitor system applied to the water distributing pipeline according to the present invention.

The synthetic sensor S is attached in the form of a ringed belt on the side of a jointing portion of each component piping of the water distributing pipelines along the outer circumferential portion of each piping, and incorporates an underwater microphone S1, a measuring sensor S3 for an internal temperature of the component piping, and other measuring sensors in a pair of semi-circular sensor holder members S' which are fitted to the piping, and are adapted to be joined together with each other.

In the synthetic sensor S, sound detection is feasible by using the underwater microphone S1 stationarily positioned on an internal surface of the piping provided with flanges 1', 1' of adjacent pieces of piping 1, 1 which are jointed together via packing, and the output signals given from the microphone S are inputted into an amplifier 2 together with those from each of the other measuring sensors provided within a pair of sensor holder members (see FIGS. 1 and 2).

Radiation doses are detected and measured at opposed positions outside the piping by means of measuring sensors S2, S2 for underground radiation doses which are disposed at predetermined positions within the pair of sensor holding members S'.

Measuring sensors S3, S3 for the internal temperature of the piping are arranged at predetermined positions within the pair of sensor holding members S', and these sensors detect and measure heat at places outside the piping which oppose the sensors. On the other hand, a measuring sensor S3' for the internal temperature of the piping which is stationarily positioned in the internal surface of the piping precisely as the underwater microphone S1 also cooperates with the measuring sensors S3, S3 for the internal temperature of the piping to execute heat detection. The measuring sensor S3' for an internal temperature of the piping is arranged to input output signals therefrom into the amplifier 2 together with those from the other measuring sensors which are positioned within the pair of sensor holding members S'.

Mechanical strain of the outer portion of the piping is detected and measured at diametrically opposed external positions of the piping by using measuring sensors (strain gauges) S4, S4 for external strain of the piping which are respectively disposed at predetermined positions within the pair of sensor holding members S'. The measuring sensors S4, S4 are arranged to input output signals from them into the amplifier 2 through an intermediate portion between the upper portions of the pair of sensor holding members together with the output signals given by means of the underwater microphone S1 and the measuring sensor S3' for an internal temperature of the piping.

Moreover, the potential difference between the piping and the contact portion of each synthetic sensor with the underground earth, and the external magnetism of the piping are respectively detected and measured at diametrically opposed external positions of the piping by means of measuring sensors S5, S5 for potential difference between the piping and the contact portion of each synthetic sensor with the underground earth, and measuring sensors S6, S6 for the external magnetism of the piping, which measuring sensors S5,S5 and S6, S6 are disposed at predetermined positions within the pair of sensor holding members S'.

Output signals from these measuring sensors S5,S5 and S6, S6 are inputted into the amplifier 2 through an intermediate portion between the upper portions of the pair of sensor holding members S', S' together with the output signals given by means of the underwater microphone S1 and the measuring sensor S3' for an internal temperature of the piping as described in the foregoing for the measuring sensors (strain gauges) S4, S4 for external strain of the piping.

Also, underground vibration is detected together with internal sound of the piping by using the underwater microphones S1 for sound detection, and the output signals of vibration from the microphones are inputted into the amplifier 2 as described in the foregoing.

The synthetic sensors S attached to both ends of the piping laid across each of a great number of specified intervals of place which are set at necessary positions in the whole of each pipeline give therefrom data signals for each of sound, radiation, heat, mechanical strain, electricity, magnetism, and vibration. As shown in the block diagram of FIG. 1, each of these data signals are transmitted from the sensors S, S at both ends of each specified interval of place to the amplifier 2 to thereby allow it to be amplified by the use of the amplifier 2 for each specified interval of place. Next, each data signal is inputted into an A-D converter 3. In this converter, each of the data obtained from the underwater microphone S1 of a sound sensor, the measuring sensors S2 for underground radiation doses, the measuring sensors S3 for an external temperature of the piping, the measuring sensors S4 for external strain of the piping, the measuring sensors S5 for potential difference between the piping and the contact portion of each synthetic sensor with the underground earth, and the measuring sensors S6 for external magnetism of the piping within the synthetic sensors S is converted from a wave form of analogue signal thereof to a digital signal.

Each data signal given from the synthetic sensors at both ends of each specific interval of place in the pipeline, and thus digitized is inputted into a data processing means 6 for information of abnormality through a wireless transmitting means 4, a telephone circuit or any other similar means. Over the entire pipelines, a great number of specific intervals of place are set at necessary positions (which are considered to cause serious damage if disaster takes place in them), and in FIG. 1, a firstly set specific interval of place is named as No. 1 specific interval of place, an intermediately set specific interval of place named as No. 1+n specific interval of place (in this case, n=a variable), and a lastly set specific interval of place as No. N specific interval of place. Thus, FIG. I shows that specific intervals of place of N in number are set over the whole of the pipeline.

In the data processing means 6 for information of abnormality, each digitized data signal concerning sound, radiation, heat, mechanical strain, electricity, magnetism and vibration detected and measured across each of the specified intervals of place (Nos. 1 to N specific interval of place) is collected and analyzed to thereby achieve analysis and measurement of abnormal information in connection with water leakage, radiation, detected heat (including abnormal information of a change in the geologic stratum such as active faulting which can be caused by a variation from the normal condition in the difference between the detected internal and the detected external temperature of the piping), external strain of the piping, occurrence of electrolytic corrosion which can result from a potential difference between the piping and the contact portion of each synthetic sensor with the underground earth, formation of an underground cavity which can be caused by underground vibration, and the like.

When abnormality is detected in the magnetism, or in other words, if the magnetism increases to some extreme degree, each of several pieces of information described in the foregoing can not be analyzed or measured, and therefore, the analyzing and measuring circuit for these pieces of information is allowed to be broken.

If such analysis of the digitized data signal inputted into and by the use of the data processing means 6 for information of abnormality identifies existence of abnormality, the processing means 6 is arranged to output abnormal data to indicate at least a specific interval of place in the pipeline at which trouble occurs, (together with the position of the source of trouble occurrence if it can be located,) and also particulars for the trouble which takes place, by using a display unit 7 for information of abnormality.

Such data can be printed out from a printer means 8 by operating keys of keyboards connected to the display unit 7. In FIG. 1, the mark x indicates water leakage which is abnormality occurring in water distributing piping 1.

Description will now be given with reference to the flow chart of FIG. 3 for a procedure in which abnormal information is collected and analyzed by using the two synthetic sensors S, S provided on both ends of each specific interval of place in the pipeline to thereby detect and indicate a specific interval of place in the pipeline at which trouble occurs.

Firstly, for sound, radiation, heat, mechanical strain, potential difference between the piping and the contact portion thereof with the underground earth, magnetism, vibration and the like, analogue signals given from the respective component sensors S1 to S6 of the synthetic sensors S provided on both ends of each of the specific intervals of place set at required portions of the entire pipeline are converted into digital signals.

The signals of data output thus digitized are transmitted and inputted to the data processing means 6 for information of abnormality the synthetic sensors provided on both ends of each of the specific intervals of place through a wireless transmitting means, a telephone circuit or any other similar means.

The data processing means 6 in which data signals are processed checks for normality each kind of information signal for each receipt thereof to thereby judge whether the signal denotes abnormality or not. If the data processing means 6 judges a signal not to be abnormal, the data processing means 6 finishes detecting operation thereof for the signal. If the data processing means 6 judges the signal to be abnormal, the data processing means 6 continuously detects a specific interval of piping which emits signals of abnormality information, and particulars of the abnormality information to thereby allow the specific interval of place and the particulars of abnormality to be indicated by using the monitoring screen of the display unit 7 for information of abnormality. Relative required data are printed out from the printer means 8 by operating keys of the key board of the data processing means 6. A series of abnormality detecting operation is thereby completed.

Thus, the provision of the synthetic sensors on both ends of each of a great number of specific intervals of place set over the whole of the pipeline facilitates the location of a specific interval of place in the pipeline at which trouble occurs, and the defining or presumption of particulars of the trouble only by operating keys of the detector unit.

Next, a preferred embodiment of the synthetic danger predicting and disaster preventing monitor system according to the present invention, which is arranged by using the method of applying the whole of the pipelines to the synthetic danger predicting alarm sensor will now be described with reference to the diagram of typical operation of said monitor system.

In FIG. 4, a total number of N of specific intervals of place are set at required portions of each of the pipelines which form a network of water distributing piping, and these specific intervals of place are denoted by using 1 for the firstly set one and 1+n (in this case, n=a variable) for the other ones for convenience of illustration.

The water distributing piping 1 laid across a specific interval of place has the synthetic sensors S, S attached to the jointing portions thereof immediately under a pair of manhole covers which are positioned at both end portions of the piping 1. In order to detect sound, radiation, heat, mechanical strain, electricity, magnetism and vibration, each synthetic sensor S comprises unit sensors which respectively form a detector portion for each of the detecting objects. Detected data outputted by means of the unit sensors are collectively inputted into a wireless data transmitter means 10 which incorporates an A-D converter, and is attached to an internal wall of the manhole.

The wireless data transmitter means 10 having an A-D converter built therein is arranged to amplify each analogue signal of data which is inputted thereto from the synthetic sensors S, to convert this analogue signal into a digital signal by using the A-D converter incorporated therein, and subsequently, to transmit the digital signal in the form of a radio wave through a manhole antenna 11 which in effect is a parabolic antenna 11 mounted on a manhole cover 17.

Figure 5A:
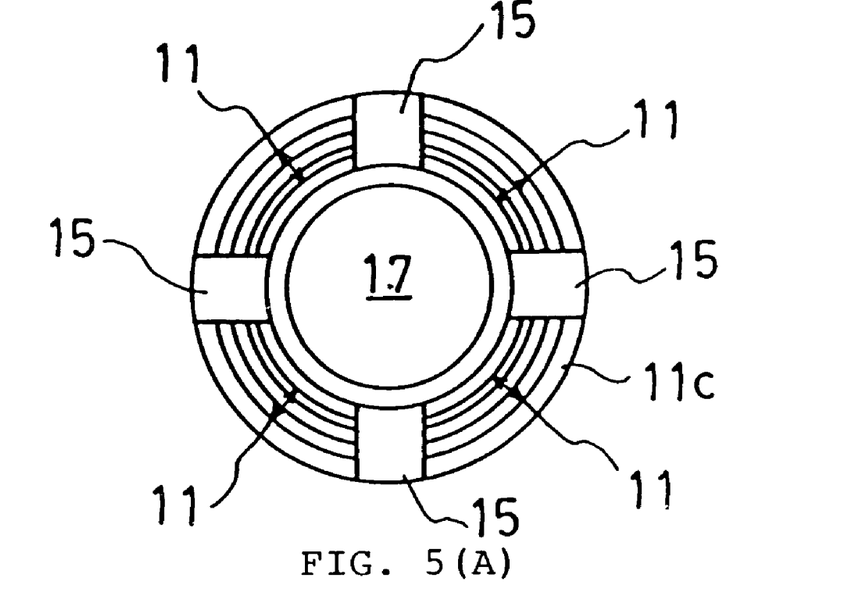
FIG. 5(A) is plan view of the manhole antenna.

More specifically, the parabolic antenna 11 is disposed on the outer peripheral edge portion of the manhole cover 17 which is supported on the earth surface at the upside of a manhole 16 and is positioned at a central portion thereof such as to be attached to or detached from the upside of the manhole 16. FIG. 5(A) is a plan view of the parabolic antenna 11, and in this FIG. 5(A), the manhole antenna 11 is contained in an annular transparent case 11c made from a super-reinforced resin such that it is split into four component portions which are arranged at quartered positions of a circumference so as to respectively form a parabolic antenna.

There are disposed solar generators 15 between every two component portions of the parabolic antenna, namely, in four places. These solar generators 15 respectively incorporate a charging battery, and their output is used via their built-in batteries as an electric power source for the synthetic sensors S and the wireless data transmitter means 10 as described hereinafter.

In this case, the reason why the parabolic antenna is separated into four component portions which respectively serve as an independent antenna, and a total of four solar generators are provided in this connection is that even if a part of the four parabolic antennas is damaged, and becomes incapable of operation as a result of, for example, passage of a weighty vehicle on the manhole cover, any other antenna can be operated.

Output of the data from the synthetic sensors S attached to the jointing portions of the water distributing piping 1, 1 is inputted into the wireless data transmitter means 10 which is fitted to the internal wall of the manhole 16, and incorporates the A-D converter.

Figure 5B:
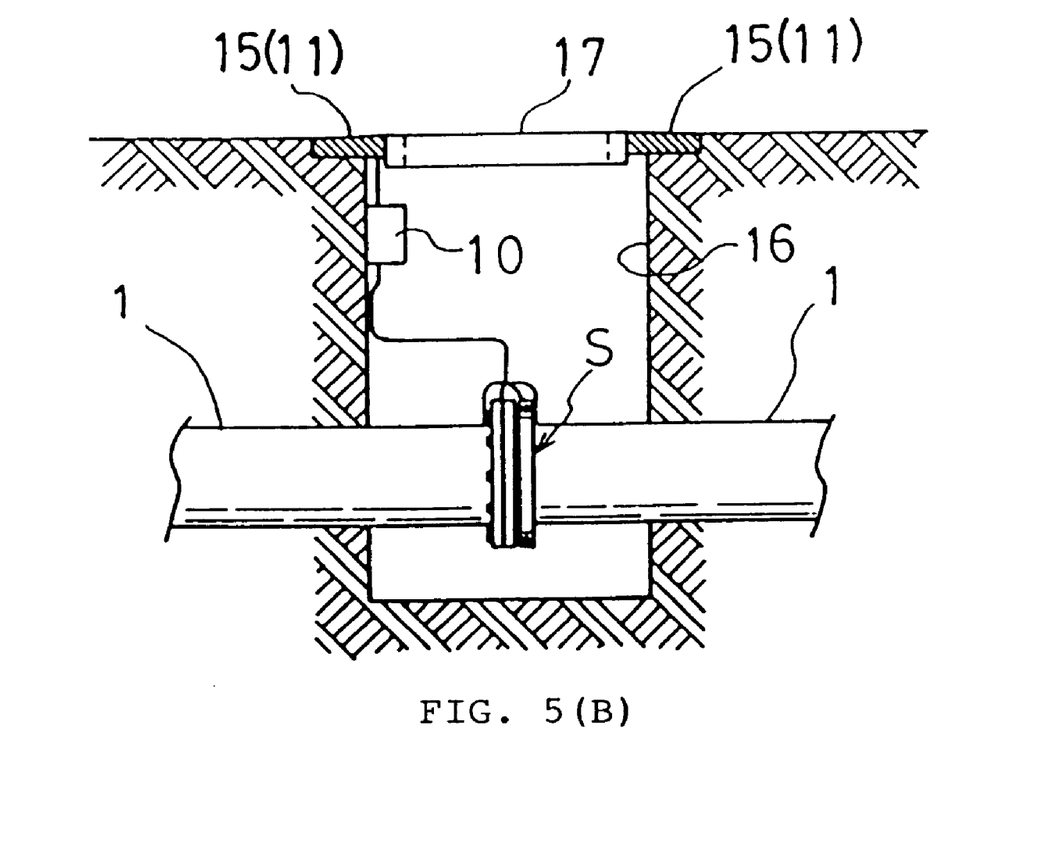
FIG. 5(B) is a side view thereof.

In connection with the data thus inputted to the wireless data transmitter means 10 from the synthetic sensors S, this transmitter means 10 is designed to transmit to a predetermined communications satellite 14 a radio wave form of output by using the four component parabolic antennas 11 which are directed to the communications satellite 14. (See FIGS. 5B and 4.)

Thus, the respective synthetic sensors S provided on both ends of each water distributing piping extending across each of a great number of specific intervals of place (No. 1 to N) set at required portions over the whole of the pipeline give digital data signals, and these digital data signals are transmitted in the form of radio waves to the communications satellite 14 through the manhole antenna 11. Moreover, the digital data signals are transmitted to a collective monitoring center on the ground through the communications satellite 14.

A parabolic antenna 12 in advance set in the collective monitoring center to receive radio waves transmitted from the communications satellite 14 also simultaneously collects digital data signals from the synthetic sensors S,S. Such digital signals are inputted to the data processing means 6 for information of abnormality, which is incorporated in the collective monitoring center. The digital signals are in effect the signals of detected information, and are analyzed for each specific interval of place. Moreover, each of the digital signals for sound, magnetism and the other detecting objects is checked for any variation from their normal condition to thereby judge if the checked digital signal denotes abnormality. If the checked digital signal is judged to denote abnormality, detection is performed upon a specific interval of place at which the abnormality takes place, and also particulars thereof. This specific interval of place and the particulars of the abnormality which are detected are displayed on a monitoring screen of the display unit 7 for information of abnormality.

Figure 8:
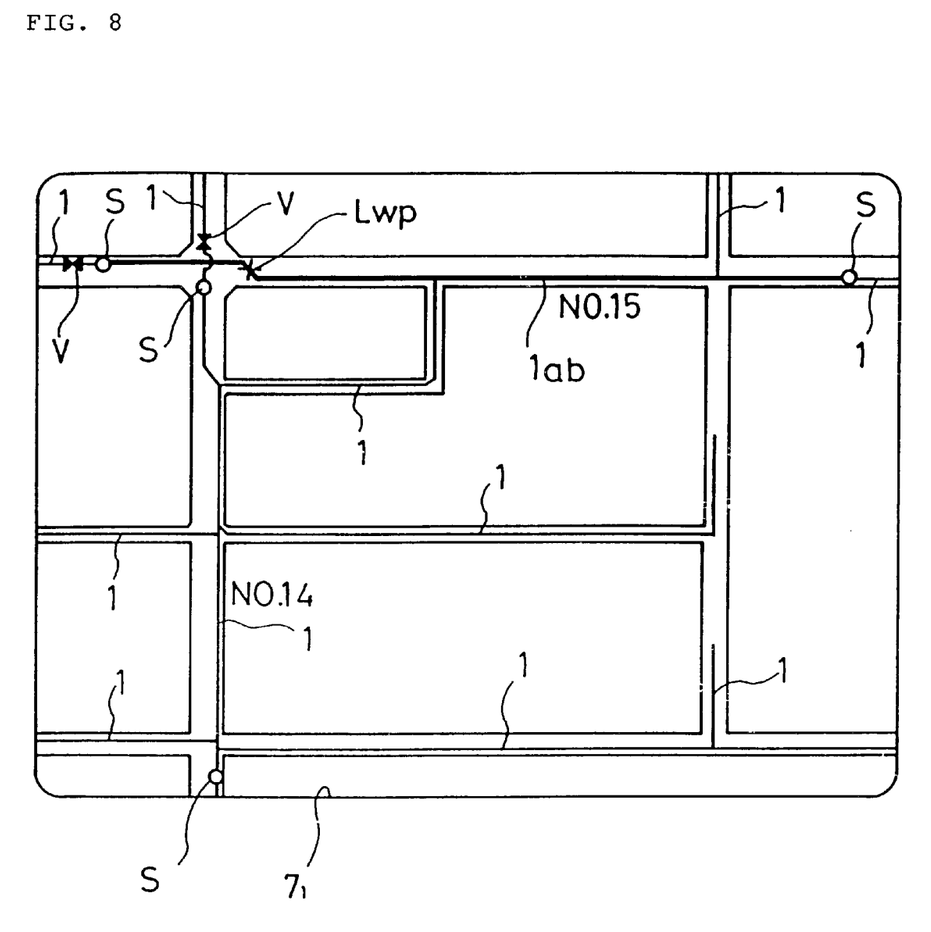
FIG. 8 is an example of a picture which depicts a specific interval of piping in the pipelines giving signals of abnormality information in the case of water leakage.

The display unit 7 for information of abnormality is provided with three monitoring screens $7_1$, $7_2$ and $7_3$, and a printer means 8, as shown in FIG. 8. The left end side monitoring screen $7_1$ is arranged to select a picture of a total network of water distributing pipelines to be monitored, or that of a pipeline (a map of the water distributing pipelines buried under the ground, or as the case may be, a picture of a specific interval of pipeline which is laid through a structure) including any desired specific interval of pipe therein at which trouble occurs, as located and indicated on a map incorporated in said display unit, by operating keys of a key board 9, whereby at least a specific interval of place at which trouble occurs is allowed to be indicated together with a particular position of trouble occurrence according to the substance of the trouble.

Also, the middle monitoring screen $7_2$ is designed to indicate particulars of any detected trouble. For example, in the case of trouble of water leakage, use of "Method for Detecting Water Leakage from Water Distributing Piping" for which the applicant of the present application previously filed a Patent Application No.296257-1997 allows the position of water leakage to be detected from the peak position of a wave form composed for the sounds of the water leakage from the synthetic sensors S, S provided on both ends of a specific interval of place at which the trouble takes place, thereby achieving indications of the position of water leakage relative to both sensors S, S and of the amount of water leakage per unit time which can be presumed from the intensity of the sounds of water leakage.

Moreover, the right end side monitoring screen $7_3$ is used to make reports on the occurrence of trouble. Also, the printer means 8 allows desired data to be printed out in connection with the occurrence of trouble.

The danger predicting and disaster preventing monitor system described in the foregoing is applied by using pipelines for urban waterworks. This achieves constant collective remote monitoring of occurrence of trouble such as water leakage, subsidence or collapse of the ground, formation of a cave in the underground earth, abnormal radiation, variations in a geologic stratum, extreme rise in heat (which may cause fire or explosion of the manufacturing line in a structure of, for example, a workshop), and abnormal potential difference between the piping and the contact portion of each synthetic sensor with the underground earth (which may result in electrolytic corrosion), whereby it is feasible to know in advance a dangerous condition which is presumed to result in disaster, and corresponding speedy measures can be taken against it.

In the danger predicting and disaster preventing monitor system described in the foregoing, the fixed type collective monitoring center is used to collectively monitor accidents or trouble occurring in a great number of specific intervals of place which are set at required portions of each water distributing pipeline. In a more convenient or alternative way, a data collecting and analyzing system for information of trouble may be mounted on an automobile, and this automobile may be allowed to make the rounds of the respective specific intervals of place, whereby occurrence of trouble can be monitored.

Also, the mobile type data collecting and analyzing system can be employed as a backup system of the fixed type collective monitoring center when it falls under a malfunction for some reason.

Figures 6A, 6B:
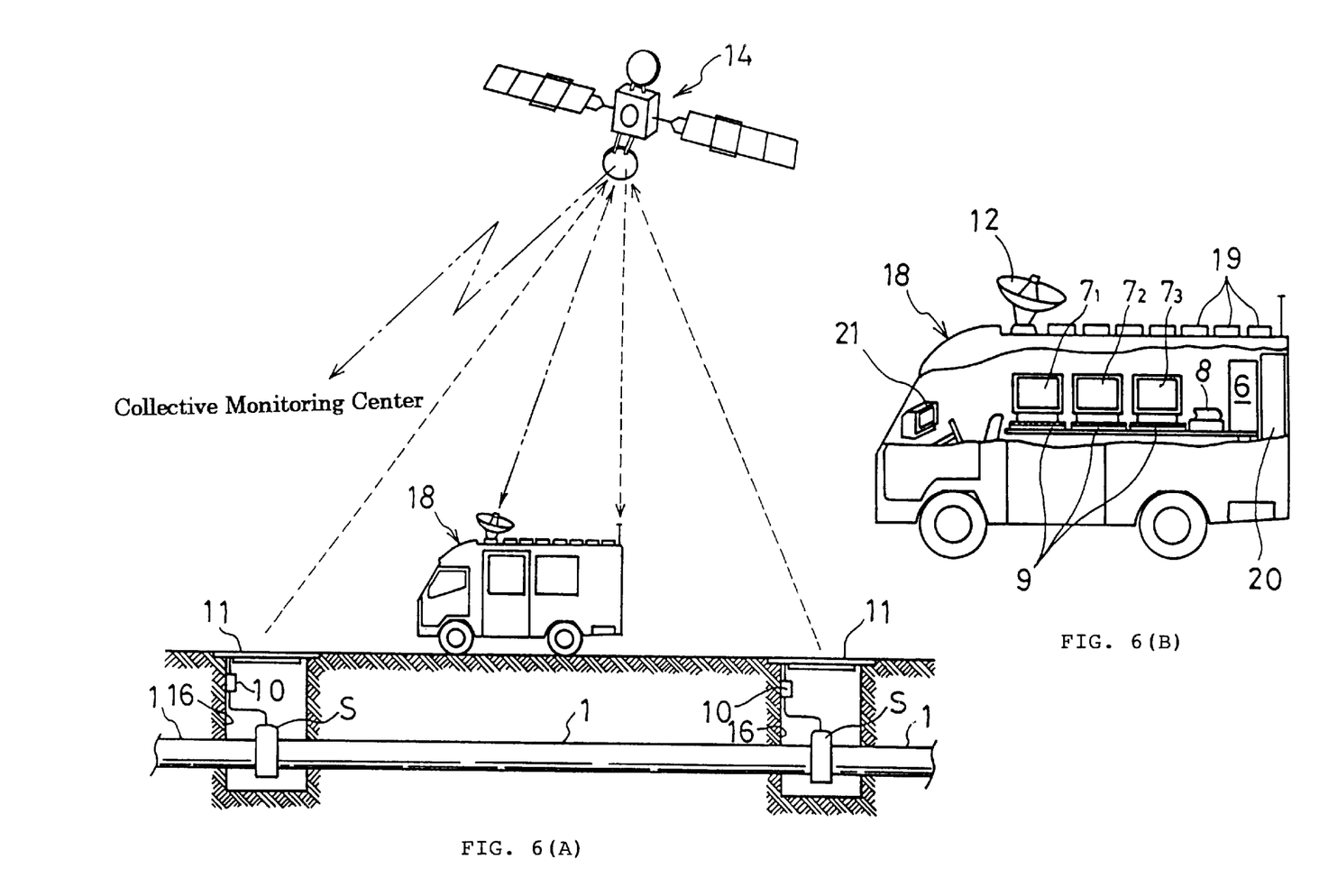
FIG. 6(A) is a diagram of operation of this detecting system.
FIG. 6(B) is a side view of the data collecting and analyzing vehicle.

FIG. 6 shows a typical illustration of a detecting system for information of abnormality which uses the data collecting and analyzing vehicle. In this case, the transmission of data signals such as information of trouble in the pipeline to the data processing means 6 mounted on the data collecting and analyzing vehicle 18 is feasible as described hereinafter.

Each of the detector portions of the synthetic sensors S, S which are attached to both end portions of the water distributing piping 1 as described in the foregoing detects data analogue signals, and such data analogue signals are inputted to the wireless data transmitter means 10 which incorporates an A-D converter, and is connected to each synthetic sensor S to thereby amplify and convert these analogue signals to digital signals.

Subsequently, the digital signals are transmitted to the communications satellite 14 through the manhole antenna 11 of a parabolic antenna mounted along and on the outer circumferential portion of the manhole cover. A means for processing data signals, namely, the data processing means 6 for information of abnormality which is mounted on the data collecting and analyzing vehicle 18 receives data signals in the form of a radio wave for transmission from the communications satellite 14, and analyzes such data signals for each specific interval of place to thereby judge if each of the received data signals indicates information of abnormality. If a data signal received and analyzed by the data processing means 6 is judged to be a signal of abnormality, this signal is detected as a specific interval of place in a pipeline at which trouble occurs, and this specific interval of place is indicated on a picture of a total number of pipelines or that located and revealed from a relative map by using at least the monitoring screen $7_1$ of the display unit 7 for information of abnormality, while at the same time, according to particulars of the trouble, the monitoring screen $7_1$ also displays thereon the definite position at which the trouble occurs, and the monitoring screen $7_2$ shows particulars of the trouble thereon.

Moreover, the other monitoring screen $7_3$ is arranged to indicate thereon particulars of the trouble for the use of preparation of a report on the trouble.

The respective indications using the monitoring screens $7_1$, $7_2$ and $7_3$ are feasible by operating keys of each key board 9, and also, any necessary portions of the indications can be printed out by using the printer means 8.

Also, the data collecting and analyzing vehicle 18 has an automotive type navigator 21 mounted thereon in front of the driver's seat thereof, and this navigator is designed to indicate the specific interval of place and the definite position respectively at which trouble occurs, as displayed in the monitoring screen $7_1$ described in the foregoing, as well as the position on the map at which the vehicle 18 presently exists or runs.

Moreover, the data collecting and analyzing vehicle 18 is also provided with the parabolic antenna 12 on the upper surface of the roof portion thereof such that the parabolic antenna 12 is driven by a direction rectifying means which comprises a gyrocompass or other similar means, whereby the parabolic antenna 12 is always directed to the predetermined communications satellite 14. As a result, a radio wave of data signal obtained by analysis in the data collecting and analyzing vehicle 18 is transmitted to the communications satellite from the parabolic antenna 12, and the communications satellite transmits a radio wave for data transmission back to the collective monitoring center on the ground.

If the data processing means 6 for information of abnormality in the collective monitoring center malfunctions for some reason, and fails to execute data analysis, the data collecting and analyzing vehicle 18 serves as a backup system of the data processing means 6.

Also, the parabolic antenna 12 on the data collecting and analyzing vehicle is designed to act as an antenna for the navigator 21 to transmit and receive radio waves.

In order to provide electric power to the navigator 21 and the other electrically driven units or means, a great umber of solar batteries 19 are used which are disposed on the upper surface of the roof portion of the data collecting and analyzing vehicle 18.

Consequently, the data collecting and analyzing vehicle 1 makes the rounds of the respective specific intervals of place in the pipelines to monitor any occurrence of trouble in a network of pipelines, thereby allowing the vehicle to go readily to the position at which trouble occurs. This achieves efficient application of this vehicle to the execution of measures against trouble or disaster when it occurs.

FIG. 7 shows an example of trouble which occurs in a specific interval of piping of a water distributing pipeline with respect to water leakage.

Figure 7A:
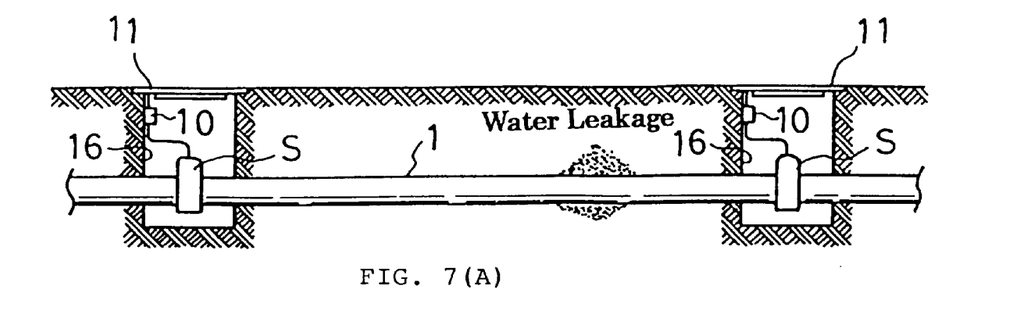

FIG. 7(A) shows occurrence of water leakage in a specific interval of piping of a water distributing pipeline.

Figure 7B:
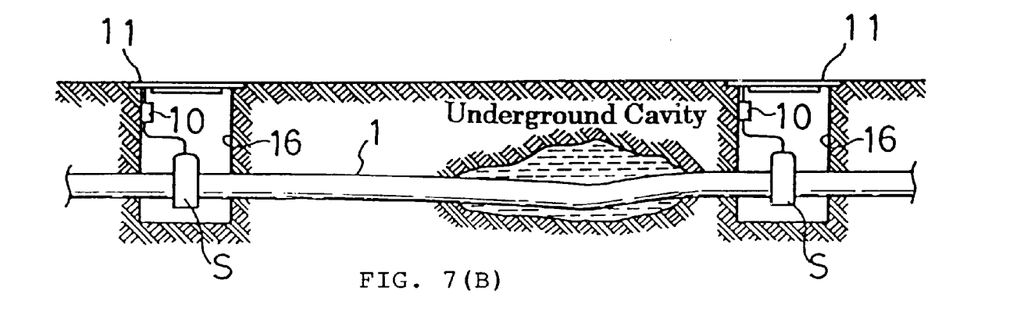

FIG. 7(B) shows the piping of FIG. 7(A) which is downwardly deflected owing to gravity because the water leakage of FIG. 7(A) increases, and as a result, the earth and sand around the portion of the water leakage flows out, thereby causing an underground cavity around this portion.

Figure 7C:
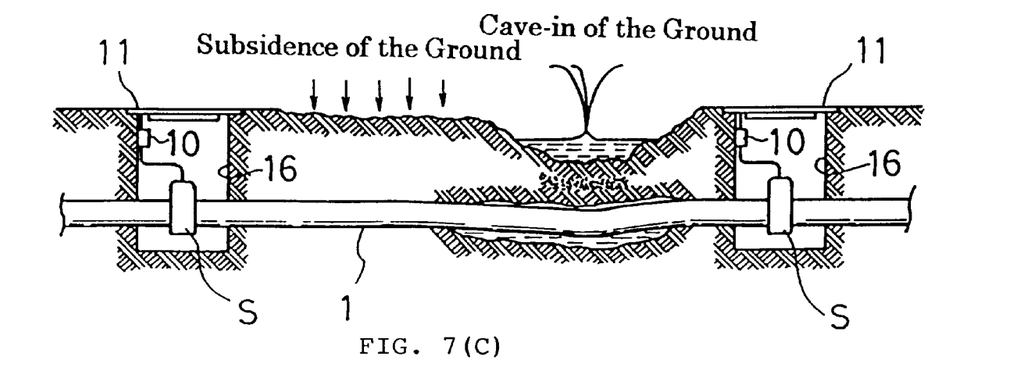

FIG. 7(C) depicts a subsidence of the ground which is caused by a successive enlargement of the underground cavity. In this case, the data signals obtained as a result of detection and measurement made by the underwater microphone S1 (See FIG. 2.) of each of the synthetic sensors S, S attached to both ends of the specific interval of piping are transmitted to the communications satellite 14 through the manhole cover type antenna 11. Such data signals are received and analyzed by the data processing means 6.

Subsequently, the wave forms of the underwater sounds from both sensors are composed into a single wave form by using the invention "Method for Detecting Water Leakage from Water Distributing Piping" proposed by the applicant of the present application in Patent Application No.296257-1997 previously filed, and the wave form thus obtained by the composition is checked for conformity to that of the sound of water leakage. In this case, if the composed wave form is judged to be that of the sound of water leakage, the position of the peak thereof is detected to thereby allow the position of water leakage to be located by computation, and also, it is feasible to presume the amount of water leakage.

If the water leakage increases, and a cavity is formed under the ground as a result of outflow of the earth and sand, and when the wave form obtained by composition of the signals of wave forms given by the underwater microphone S1, S1 of both synthetic sensors is judged to be for underground sound caused by underground vibration, some underground trouble such as a cavity can be detected. In this case, similarly to water leakage under the ground, the peak position of a vibratory wave form obtained by composition of the wave forms given by the microphones S1,S1 allows the identification of the position of a vibratory source such as the position of the cavity. This can predict a place at which the ground caves in, and results in a subsidence of an ambient or neighboring area thereof as shown in FIG. 7(C).

Also, in this case, strain of the water distributing piping which can be caused by curvature thereof can be simultaneously detected by using the measuring sensor S4 for external strain of the piping which is provided within the synthetic sensor S. Consequently, it is feasible to know that curvature takes place at a specific interval of piping 1 in the pipelines.

If water leakage takes place at a specific interval of piping in a network of water distributing pipelines, as described in the foregoing, the display unit 7 for information of abnormality in the collective monitoring system (See FIG. 4.) or the movable type monitoring system (See FIG. 6) can indicate the place in the pipelines at which the trouble occurs, as shown in FIG. 8.

FIG. 8 gives an example in which a specific interval of piping having a data signal of abnormality given thereon with respect to water leakage is indicated on the monitoring screen $7_1$ of the display unit 7. This monitoring screen $7_1$ selectively indicates a diagram of pipelines including any desired specific interval of piping (No.15 Interval of Piping in this case) as located and revealed from a relative map together with a part of streets by operating keys of the key board.

In FIG. 8, S represents with, for example, a small red circular the synthetic sensor attached to each of both ends of No.15 Interval of Piping, and each of those of No.14 Interval of Piping. 1 and V respectively represent water distributing piping and a sluice valve.

If water leakage occurs in one of the pipelines, the data processing means 6 gives relative signals to thereby indicate on the monitoring screen a specific interval of piping (depicted at No.15) at which the trouble takes place, by using a thick line of a different color (for example, brown) from that (for example, blue) of the other specific intervals of piping so that the specific interval of piping which undergoes occurrence of trouble is clearly shown.

Also, a definite place Lwp at which water leakage takes place is indicated on the abovementioned thick line in a cross-shaped configuration of the same color as that of the thick line. This allows a watcher to definitely know the place at which the water leakage occurs, and to take speedy measures against the trouble.

Also, if a danger at which a different kind of disaster occurs (for example, a risk of subsidence of the ground which can be caused by formation of a underground cavity) is detected as underground abnormal vibration by using the underwater microphone S1 of the synthetic sensor S, it is feasible to indicate on the monitoring screen $7_1$ a specific interval of piping undergoing the underground cavity in a thick colored line, as described in the foregoing, whereby the place having the cavity therein which is in effect the source of abnormal vibration can be detected and indicated, while at the same time, it can be indicated that the trouble of abnormal vibration is in effect an underground cavity. As a result, early measures can be taken against occurability of a disaster.

Also, if leakage of radiation occurs adjacently to a specific interval of piping, and the measuring sensors S2, S2 for underground radiation doses detect an abnormal dose of radiation, it is feasible to indicate a specific interval of piping which has the generating source of the abnormal dose of radiation thereabout.

Moreover, if variation from a normal condition is detected for a difference between the measuring sensors S3, S3 for the internal and external temperatures of the component piping of each pipeline in the temperatures detected by them, occurrence of a change in a geologic stratum can be detected including active faulting in a specific interval of pipeline.

On the other hand, if in a pipeline laid through a structure such as a factory and the like, the measuring sensor S3 for an external temperature of piping which is disposed within the synthetic sensors S, S attached to both end portions of a specific interval of piping detects an extremely high temperature on the external portion of the piping which can be caused by an extreme increase in the ambient temperature of the piping, it is feasible to detect and indicate on the monitoring screen $7_1$ said specific interval of piping at which there is the risk that the extreme increase in the ambient temperature of the piping causes fire, explosion or other similar disaster, and to denote on the monitoring screen $7_2$ that the trouble is an extreme increase in the ambient temperature of the piping, thereby achieving prediction of a danger in which such a kind of disaster occurs, to take immediate measures against it.

The application of the synthetic danger predicting and disaster preventing monitor system described in the foregoing can collectively monitor a dangerous circumstance in which disaster may takes place at or adjacently to each of a great number of specific intervals of piping in a network of water distributing pipelines, whereby it is feasible to know a specific interval of piping at which disaster occurs or threatens to occur, while at the same time, particulars of occurable disaster can be identified or predicted. This can predict incidence of every disaster which can be caused by a variety of factors, perform disaster preventing controls, and take early measures against disastrous incidence.

In the method according to claim 1, in which the pipelines laid under the ground or through a structure are used as the synthetic danger predicting and disaster preventing monitor system, a network of pipelines laid under the ground such as to stretch over large cities or small cities or towns, or those laid around through structures such as buildings and the like are employed as the alarm sensor which generally predicts the dangers of occurrence of a variety of disaster, and if the values of measures obtained from the detector portions of the synthetic sensors attached to both ends of each specific interval of piping of the respective pipelines in connection with sound, radiation, heat, mechanical strain, electricity, magnetism and vibration are abnormal such that they vary from their normal values, thereby resulting in incidence of disaster or great trouble in said specific interval of piping, the data signals of abnormality which are thus obtained are analyzed, whereby it is feasible to predict the kind or type of occurable disaster, and a specific interval of piping at which the disaster may happen.

In the invention according to claim 2, the attachment of the synthetic sensors to both end portions of a specific interval of piping is easily feasible by making the use of the internal spacing of the manhole across or the structure through which the piping extends.

In the invention according to claim 3, in order to receive detecting signals in connection with sound, radiation, heat, mechanical strain, electricity, magnetism and vibration, the synthetic sensors are arranged to be attached in a configuration of a ringed belt to the outer circumferential portions of the piping at both ends thereof. Therefore, the attachment of the synthetic sensors is easily feasible to both end portions of each specific interval of piping.

The synthetic sensors are provided with the underwater microphones such that they protrude into the piping, and they detect sound and vibration.

Also, the synthetic sensors are fitted with the measuring sensors for an external underground radiation dose of the piping, the measuring sensors (strain gauges) for external strain of the piping, the measuring sensors for potential difference between the piping and the contact portion of each synthetic sensor with the underground earth, and the magnetism sensors on the outer circumferential portion of the piping. Consequently, these measuring sensors are allowed to respectively detect radiation, mechanical strain, electricity, and magnetism.

Moreover, the synthetic sensors are provided with the temperature sensors therein on the outer circumferential portion of the piping, and with the other temperature sensors on the inner circumferential portion of the piping such that they protrude into the piping. Both kinds of temperature sensors can simultaneously detect a temperature on the outer circumferential portion of the piping and an internal temperature thereof.

The measuring signals detected by using these measuring sensors are readily subjected to their collective analyses as data signals given from the synthetic sensors to thereby detect each abnormality.

In the synthetic danger predicting and disaster preventing monitor system according to claim 4, if trouble takes place in a network of water distributing pipelines which are spread over large cities or small cities or towns, at least a specific interval of piping in the pipelines at which the trouble occurs is indicated on the monitoring screen of the display unit for information of abnormality, on which the pipelines are indicated, and also, particulars of the trouble are displayed, thereby allowing the place and particulars of the trouble to be identified or presumed before disaster results.

In practice, the synthetic sensors attached to both end portions of each of a great number of specific intervals of piping set over the whole of the water distributing pipelines detect measuring signals in connection with sound, radiation, heat, mechanical strain, potential difference between the piping and the contact portion of each synthetic sensor with the underground earth, magnetism, and vibration. Subsequently, such measuring signals are always collectively received in the collective monitoring center through the communications satellite. In this case, if telephone circuits on the ground are used for transmission, it is ensured that any relative trouble is prevented. The measuring signals received in the collective monitoring center are collected and analyzed by using the data processing means.

Thereafter, as described in the foregoing, the monitoring screen of the display unit for information of abnormality, on which the pipelines are indicated displays at least a specific interval of piping in the pipelines at which the trouble occurs, and also, particulars of the trouble, whereby the place and particulars of the trouble can be identified or presumed before disaster results. This achieves remote monitoring for the prevention of disaster. As a result, it is feasible to take speedy measures against it.

In the invention according to claim 5, the movable type data collecting and analyzing vehicle acting as a backup system of the fixed type collective monitoring center falling under a malfunction to thereby allow danger of disastrous incidence to be detected is mounted with an automotive navigator thereon so that it serves as a display unit for the position of occurable disaster.

If trouble occurs at a specific interval of piping in the pipelines, this navigator is capable of indicating this specific interval of piping as well as the position on a map at which the vehicle mounted with the navigator thereon presently runs. Therefore, the vehicle can make the rounds of the respective specific intervals of piping in the pipelines to monitor any occurrence of trouble, and can readily reach the place at which trouble happens, thereby allowing the vehicle to be efficiently used for taking measures against incidence of disaster.

What is claimed is:

1. A method wherein a plurality of pipelines which are laid under the ground or through a structure at specific intervals are employed in their entirety for a synthetic danger predicting alarm sensor, characterized in that both end portions of each of said plurality of pipelines are fitted with synthetic sensors, each of said synthetic sensors are provided with detector portions for taking measurements in connection with at least sound, radiation, heat, mechanical stain, electricity, magnetism and vibration, and wherein signals of abnormality information which are given for the external or internal portion of each pipeline laid under the ground or through a structure, or the interior of a geologic stratum or that of the structure as a result of variation of measuring signals from their normal condition are simultaneously measured by means of the detector portions of said sensors, and means for analyzing said signals to predict disastrous trouble at one or ones of specific intervals of the plurality of pipelines.

2. The method according to claim 1, characterized by that the synthetic sensors attached to both end portions of each of said plurality of pipelines are fitted to a pair of jointing portions of the pipelines which are adjacent to each other through the pipelines and exposed in spacious portions within manholes, or a pair of exposed jointing portions of the pipelines which are adjacent to each other through the pipelines in spacious portions within the structure.

3. The method according to claim 2, wherein said detector portions compromise an underwater microphone for detecting sound and vibration attached to a ringed belt on a side of jointing portions along the outer circumferential portion of the pipelines such that it protrudes into the pipelines, radiation measuring sensors for underground radiation doses outside the pipelines which are disposed on the outer circumferential portion of the pipelines, a temperature sensor for detecting heat positioned on the outer circumferential portion of the piping and a temperature sensor arranged such as to protrude into the pipelines, strain gauges for detecting strain disposed on the outer circumferential portion of the pipelines, electric measuring sensors positioned on the outer circumferential portion of the pipelines for detecting a potential difference between the pipelines and a contact portion of the pipelines with the earth, and magnetism sensors disposed on the outer circumferential portion of the pipelines.

4. A synthetic danger predicting and disaster preventing monitor system, comprising synthetic sensors attached to both end portions of piping positioned across each of a plurality of specific intervals at required portions of a network of water distributing pipelines to detect signals of abnormality in connection with at least sound, radiation, heat, mechanical strain, potential difference between the piping and a contact portion of each synthetic sensor with the underground earth, electricity, magnetism and vibration, a wireless transmitting means for emitting radio waves to a communications satellite from a wireless data transmitter means through a parabolic antenna fitted to the outer circumferential portion of a manhole cover after the data signals are subjected to A-D conversion, a receiving means for data signals transmitted in the form of radio waves by the communications satellite, a data processing means in which the received data signals are inputted and are analyzed for each specific interval in the pipeline to check for abnormality, and if the data signals are judged to be those of abnormality information, any specific interval producing the signals of abnormality information, a display unit for information of abnormality in which upon receipt of signals from the data processing means, at least the specific interval producing the signals of abnormality information is indicated on a displaying screen of the pipelines including specific intervals located and revealed from a network of water distributing pipelines on a map, a monitoring screen to indicate the position of trouble occurrence, a monitoring screen for indicating particulars of trouble in each pipeline, and a printer means whereby a place and particulars of trouble are located or presumed before disaster results so that a danger can be predicted.

5. The synthetic danger predicting and disaster preventing monitor system according to claim 4, wherein the monitoring screen for indicating the position of trouble occurrence is an automotive navigator mounted on a vehicle together with a receiving means for data signals transmitted by the communications satellite, and a data processing means for analyzing data signals received thereby, and the navigator is arranged to indicate a specific place at which trouble occurs, on a picture of a map displayed thereon, thereby achieving mobile danger control.

* * * * *